United States Patent
Kijima et al.

(10) Patent No.: US 12,263,824 B2
(45) Date of Patent: Apr. 1, 2025

(54) VEHICLE WHEEL SLIP CONTROL DEVICE AND METHOD

(71) Applicant: Robert Bosch GmbH, Stuttgart (DE)

(72) Inventors: Naoto Kijima, Northville, MI (US); Shunsaku Ono, Novi, MI (US)

(73) Assignees: Robert Bosch LLC, Farmington Hills, MI (US); Robert Bosch GmbH, Stuttgart (DE)

( * ) Notice: Subject to any disclaimer, the term of this patent is extended or adjusted under 35 U.S.C. 154(b) by 220 days.

(21) Appl. No.: 18/074,767

(22) Filed: Dec. 5, 2022

(65) Prior Publication Data

US 2024/0182008 A1    Jun. 6, 2024

(51) Int. Cl.
*B60T 8/176*    (2006.01)

(52) U.S. Cl.
CPC ........... *B60T 8/176* (2013.01); *B60T 2220/00* (2013.01)

(58) Field of Classification Search
CPC ............................... B60T 8/176; B60W 10/06
See application file for complete search history.

(56) References Cited

U.S. PATENT DOCUMENTS

| | | | |
|---|---|---|---|
| 2009/0326777 A1* | 12/2009 | Oshima | B60T 8/175 701/84 |
| 2013/0144476 A1* | 6/2013 | Pinto | B60L 50/00 903/930 |
| 2018/0304871 A1* | 10/2018 | Eckert | B60T 8/17554 |

FOREIGN PATENT DOCUMENTS

| | | |
|---|---|---|
| EP | 3895942 | 10/2021 |
| GB | 2454337 | 5/2009 |
| WO | 2021260475 | 12/2021 |

* cited by examiner

*Primary Examiner* — George C Jin
(74) *Attorney, Agent, or Firm* — Charles Duncan, Jr.

(57) ABSTRACT

A novel wheel slip control device and method improve upon conventional anti-lock brake systems by providing a user interface device which allows the vehicle operator to manipulate the slip ratio threshold of the anti-lock brake system on demand as he or she executes a slide or drift maneuver—thus preventing the system from interrupting the maneuver while also retaining the safety benefits of the anti-lock brake system during ordinary vehicle operation.

3 Claims, 7 Drawing Sheets

VEHICLE WHEEL SLIP CONTROL DEVICE AND METHOD

TECHNICAL FIELD

This disclosure relates to a device and method for controlling wheel slip in a vehicle such as a motorcycle.

BACKGROUND

Conventionally, anti-lock brake systems are used to improve vehicle traction while braking. As the vehicle operator applies the brake, if the slip ratio for a wheel of the vehicle exceeds a predetermined threshold, the anti-lock brake system will reduce the braking force applied to the wheel, lowering the slip ratio for that wheel. Once the slip ratio has been reduced below a predetermined floor, the anti-lock brake system will again increase the braking force until the slip ratio reaches the threshold, at which time the braking force will again be reduced until the slip-ratio reaches the floor—resulting in an oscillation of the braking force. An advantage of such systems is improved safety through reduced stopping distance and increased steering control while braking, but a disadvantage is that they prevent a vehicle operator from intentionally sliding or drifting the vehicle when desired.

The wheel slip control device and method disclosed herein improve upon conventional anti-lock brake systems by providing a user interface device which allows the vehicle operator to manipulate the slip ratio threshold of the anti-lock brake system on demand as he or she executes a slide or drift maneuver—thus preventing the system from interrupting the maneuver while also retaining the safety benefits of the anti-lock brake system during ordinary vehicle operation.

SUMMARY

One aspect of this disclosure is directed to an apparatus for controlling wheel slip in a vehicle operated by a rider. The apparatus comprises an anti-lock brake system, wherein the anti-lock brake system controls a braking force on a wheel of the vehicle in relation to a slip ratio of the wheel, such that the anti-lock brake system reduces the braking force if the slip ratio exceeds a threshold. The apparatus further comprises a user interface device operably connected to the anti-lock brake system, the orientation of the user interface device is manipulable by the rider within a range of motion, and the anti-lock brake system varies the threshold along a range of values based at least in part on the orientation of the user interface device. The vehicle is preferably a two-wheeled motorcycle or a three-wheeled motorcycle. The user interface device is preferably a throttle of the vehicle, but could alternatively be a handlebar of the vehicle, or a dedicated input device.

The apparatus may further comprise an inertial measurement unit operably connected to the anti-lock brake system, wherein the inertial measurement unit outputs an inertial measurement signal to the anti-lock brake system, and the anti-lock brake system determines based at least in part on the inertial measurement signal whether there is a slide request from the rider, and the anti-lock brake system only varies the threshold based on the orientation of the user interface device if there is a slide request from the rider.

Another aspect of this disclosure is directed to a method for controlling wheel slip in a vehicle operated by a rider and equipped with an anti-lock brake system. The method comprises setting a slip ratio threshold of the anti-lock brake system to an initial value, applying a braking force to a wheel of the vehicle in response to the rider actuating a brake of the vehicle, increasing the slip ratio threshold from its initial value in response to the rider manipulating the orientation of a user interface device on the vehicle, determining a slip ratio of the wheel, and reducing the braking force if the slip ratio exceeds the threshold. As with the apparatus summarized above, the vehicle is preferably a two-wheeled motorcycle or a three-wheeled motorcycle, and the user interface device is preferably a throttle of the vehicle, but could alternatively be a handlebar of the vehicle, or a dedicated input device.

The method may further comprise generating an inertial measurement signal for the vehicle with an inertial measurement unit and determining based at least in part on the inertial measurement signal whether there is a slide request from the rider, wherein the step of increasing the slip ratio threshold from its initial value in response to the rider manipulating the orientation of the user interface device is performed if it is determined that there is a slide request from the rider but is not performed if it is determined that there is no slide request from the rider.

Another aspect of this disclosure is directed to an anti-lock brake system controller for a vehicle operated by a rider. The controller comprises a control device configured to control a braking force on a wheel of the vehicle in relation to a slip ratio of the wheel, such that the control device reduces the braking force if the slip ratio exceeds a threshold, wherein the control device is further configured to receive a signal from a user interface device operably connected to the control device, wherein the orientation of the user interface device is manipulable by the rider within a range of motion, and wherein the control device is configured to vary the threshold along a range of values based at least in part on the orientation of the user interface device.

The anti-lock brake system controller may further comprise an inertial measurement unit operably connected to the control device, wherein the inertial measurement unit outputs an inertial measurement signal to the control device, and the control device determines based at least in part on the inertial measurement signal whether there is a slide request from the rider, and the control device only varies the threshold based on the orientation of the user interface device if there is a slide request from the rider.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
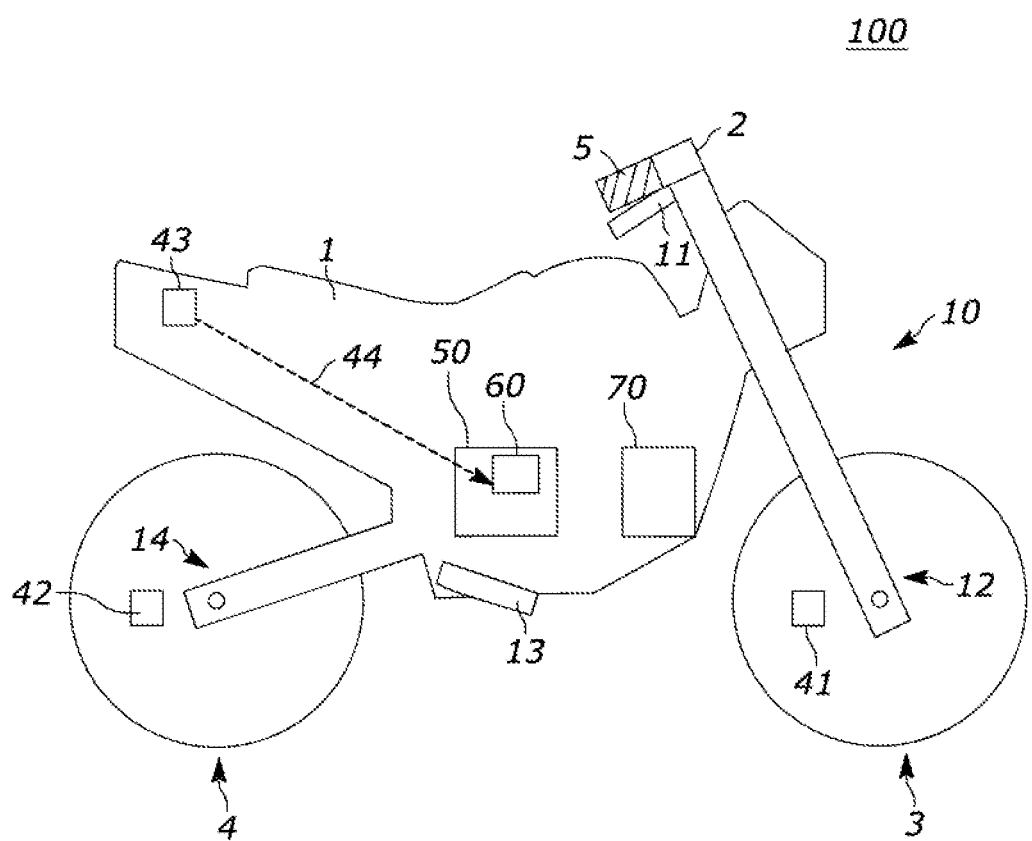
FIG. 1 is a schematic diagram showing the rough configuration of a vehicle according to an embodiment of the present invention.

As shown in FIG. 1, a vehicle 100 to be equipped with the present invention may be a two-wheeled motorcycle. Such a vehicle may comprise: a body 1; handlebars 2 turnably held by the body 1 and including a hand-operated, rotating throttle 5; a front wheel 3 held by the body 1 so as to be turnable together with the handle-bars 2; a rear wheel 4 rotatably held by the body 1; an anti-lock brake system 10; a front-wheel wheel speed sensor 41; a rear-wheel wheel speed sensor 42; an inertial measurement unit (IMU) 43; a hydraulic control unit 50 provided in the anti-lock brake system 10; a control device 60 provided in the hydraulic control unit 50 preferably comprising a processor and memory; and an engine 70.

Figure 2:
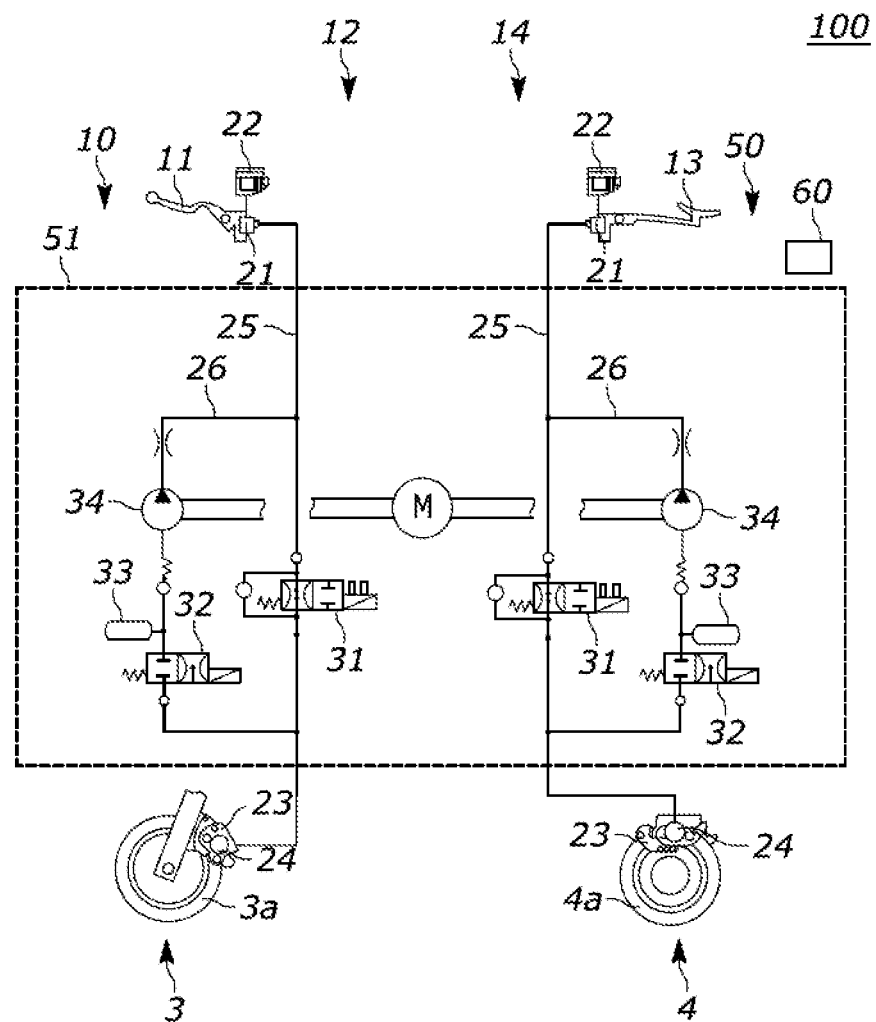
FIG. 2 is a schematic diagram showing the rough configuration of a brake system according to an embodiment of the present invention.

As shown in FIGS. 1 and 2, the anti-lock brake system 10 comprises: a first brake operation portion 11; a front-wheel braking mechanism 12 for braking the front wheel 3 in collaboration with at least the first brake operation portion 11; a second brake operation portion 13; and a rear-wheel braking mechanism 14 for braking the rear wheel 4 in collaboration with at least the second brake operation unit 13. Furthermore, the anti-lock brake system 10 comprises the hydraulic control unit 50, and a portion of the front-wheel braking mechanism 12 and a portion of the rear-wheel braking mechanism 14 are included in this hydraulic control unit 50. The hydraulic control unit 50 is a unit responsible for the function of controlling a braking force generated in the front wheel 3 by means of the front-wheel braking mechanism 12, and a braking force generated in the rear wheel 4 by means of the rear-wheel braking mechanism 14.

The first brake operation portion 11 is provided on the handlebars 2 and is operated by means of a rider's hand. The first brake operation portion 11 is a brake lever, for example. The second brake operation portion 13 is provided on a lower portion of the body 1 and is operated by means of the rider's foot. The second brake operation portion 13 is a brake pedal, for example. However, both the first brake operation portion 11 and the second brake operation portion 13 may be brake levers operated by means of the rider's hands, as with brake operation portions of a scooter or the like.

The front-wheel braking mechanism 12 and the rear-wheel braking mechanism 14 each comprise: a master cylinder 21 having a built-in piston (not depicted); a reservoir 22 attached to the master cylinder 21; a brake caliper 23 held by the body 1 and having a brake pad (not depicted); a wheel cylinder 24 provided on the brake caliper 23; a main flow path 25 for circulating a brake fluid in the master cylinder 21 to the wheel cylinder 24; and an auxiliary flow path 26 for releasing the brake fluid in the wheel cylinder 24.

An inlet valve (EV) 31 is provided in the main flow path 25. The auxiliary flow path 26 bypasses the inlet valve 31 between the wheel cylinder 24 side and the master cylinder 21 side of the main flow path 25. An outlet valve (AV) 32, an accumulator 33, and a pump 34 are provided, in succession from an upstream side, in the auxiliary flow path 26.

The inlet valve 31 is an electromagnetic valve which opens in a non-energized state and closes in an energized state, for example. The outlet valve 32 is an electromagnetic valve which closes in a non-energized state and opens in an energized state, for example.

The hydraulic control unit 50 includes: components for controlling brake fluid pressure, including the inlet valve 31, the outlet valve 32, the accumulator 33, and the pump 34; a base body 51 on which the above components are provided, with flow paths for forming the main flow path 25 and the auxiliary flow path 26 being internally formed therein; and a control device 60.

It should be noted that the base body 51 may be formed by a single member, or it may be formed by multiple members. Furthermore, when the base body 51 is formed by multiple members, the components may be split up and each provided on a different member.

Operations of the abovementioned components of the hydraulic control unit 50 are controlled by means of the control device 60. The braking force generated in the front wheel 3 by means of the front-wheel braking mechanism 12 and the braking force generated in the rear wheel 4 by means of the rear-wheel braking mechanism 14 are controlled by this means.

During a normal situation (that is, when a braking force commensurate with a braking operation performed by the rider is generated in the wheels), the inlet valve 31 is opened and the outlet valve 32 is closed by means of the control device 60. In that state, when the first brake operation portion 11 is operated, the piston (not depicted) of the master cylinder 21 in the front-wheel braking mechanism 12 is pushed in so that the hydraulic pressure of the brake fluid in the wheel cylinder 24 increases, and the brake pad (not depicted) of the brake caliper 23 presses against a rotor 3a of the front wheel 3, generating a braking force in the front wheel 3. Furthermore, when the second brake operation portion 13 is operated, the piston (not depicted) of the master cylinder 21 in the rear-wheel braking mechanism 14 is pushed in so that the hydraulic pressure of the brake fluid in the wheel cylinder 24 increases, and the brake pad (not depicted) of the brake caliper 23 presses against a rotor 4a of the rear wheel 4, generating a braking force in the rear wheel 4.

The engine 70 corresponds to an example of a drive source of a vehicle 100, and is capable of outputting motive power for driving a drive wheel (specifically, the rear wheel 4). For example, the engine 70 is provided with: one or more cylinders inside which a combustion chamber is formed; a fuel injection valve for injecting fuel towards the combustion chamber; and a spark plug. A mixed gas comprising air and fuel is formed inside the combustion chamber as a result of the fuel being injected from the fuel injection valve, and this mixed gas is ignited by means of the spark plug and combusted. As a result, a piston provided inside the cylinder moves reciprocatingly and causes a crankshaft to rotate. Furthermore, a throttle valve is provided in an intake pipe of the engine 70, and an amount of intake air to the combustion chamber varies according to a throttle degree of opening, which is the degree of opening of the throttle valve.

The front-wheel wheel speed sensor 41 is a wheel speed sensor for detecting the wheel speed of the front wheel 3

(e.g., the number of revolutions per time unit [rpm] or the distance moved per time unit [km/h], etc. of the front wheel 3), and it outputs a detection result. The front-wheel wheel speed sensor 41 may also detect another physical amount which can be substantially converted to the wheel speed of the front wheel 3. The front-wheel wheel speed sensor 41 is provided on the front wheel 3.

The rear-wheel wheel speed sensor 42 is a wheel speed sensor for detecting the wheel speed of the rear wheel 4 (e.g., the number of revolutions per time unit [rpm] or the distance moved per time unit [km/h], etc. of the rear wheel 4), and it outputs a detection result. The rear-wheel wheel speed sensor 42 may also detect another physical amount which can substantially be converted to the wheel speed of the rear wheel 4. The rear-wheel wheel speed sensor 42 is provided on the rear wheel 4.

The inertial measurement unit 43 comprises a three-axis gyro sensor and a three-direction acceleration sensor, and detects the attitude of the vehicle 100. The inertial measurement unit 43 is provided on the body 1, for example.

Specifically, the inertial measurement unit 43 detects a slide angle of the vehicle 100 and outputs a detection result to the control device 60 via an inertial measurement signal 44. The inertial measurement unit 43 may also detect another physical amount which can be substantially converted to the slide angle of the vehicle 100. The slide angle corresponds to the angle θ1 shown in FIG. 3 (that is, an angle representing inclination of the vehicle body (specifically the body 1) in relation to a direction D1 of advance of the vehicle 100). When the vehicle 100 is allowed to slide as it turns, the slide angle (the angle θ1 in FIG. 3) increases as a result of the vehicle body sideslipping.

Figure 3:
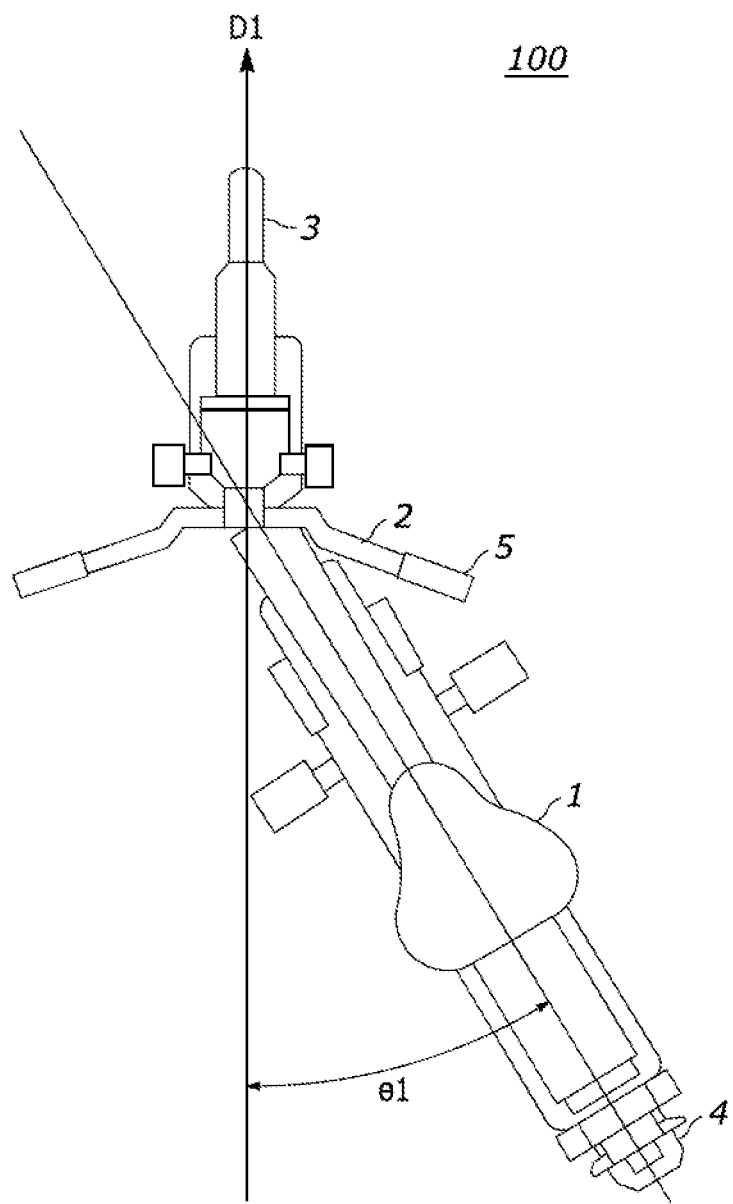
FIG. 3 is a diagram to illustrate a slide angle of a vehicle according to an embodiment of the present invention.

It should be noted that FIG. 3 shows an example in which the direction D1 of advance and the orientation of the front wheel 3 are aligned, but the direction D1 of advance and the orientation of the front wheel 3 may differ. The inertial measurement unit 43 may detect the slide angle of the vehicle 100 by identifying the direction D1 of advance of the vehicle 100 and the attitude of the vehicle 100 on the basis of detection results from each of the sensors of the inertial measurement unit 43, for example.

Figure 4:
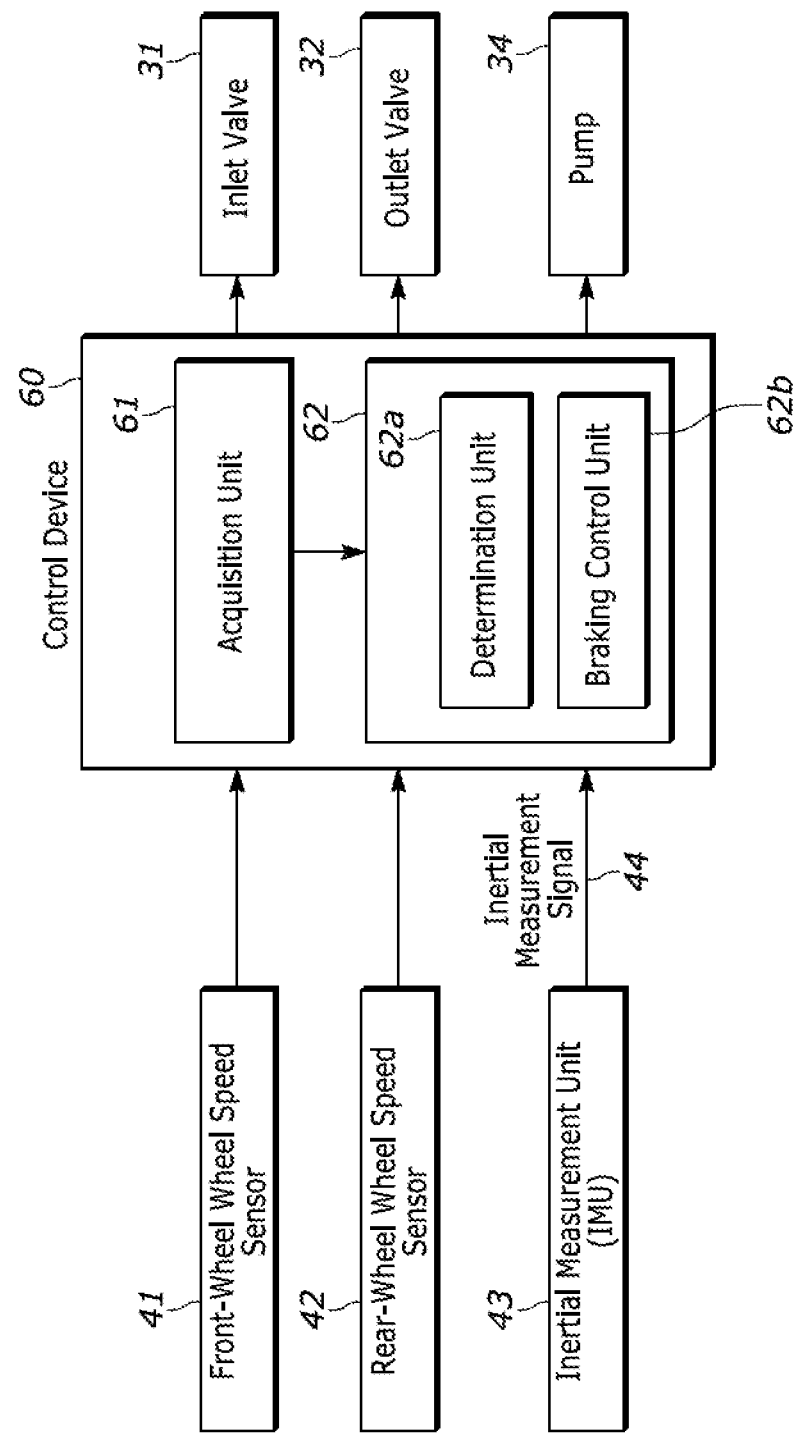
FIG. 4 is a block diagram showing an example of a functional configuration of a control device according to an embodiment of the present invention.

As shown in FIG. 4, the control device 60 comprises an acquisition unit 61 and a control unit 62, for example. Preferably, the control device 60 comprises a single processor and memory (the memory being internal or external to the processor), with the acquisition unit 61 and control unit 62 being logically separate but not necessarily physically separate. Alternatively, the acquisition unit 61 and control unit 62 are separate physical components of control device 60.

The acquisition unit 61 acquires information from each device mounted in the vehicle 100 and provides output to the control unit 62. For example, the acquisition unit 61 acquires information from the front-wheel wheel speed sensor 41, the rear-wheel wheel speed sensor 42, and the inertial measurement unit 43.

The control unit 62 controls the braking force generated in the vehicle 100 in order to control the behavior of the vehicle 100. The control unit 62 includes a determination unit 62a and a braking control unit 62b, for example.

The determination unit 62a makes various determinations. Determination results from the determination unit 62a are used for processing performed by means of the braking control unit 62b. In particular, the determination unit 62a determines whether or not there is a slide request from the rider—in other words, whether the rider has initiated or is attempting to initiate an intentional slide or drift maneuver.

The braking control unit 62b controls the braking force generated in the wheels of the vehicle 100 by controlling operation of each component of the hydraulic control unit 50 in the anti-lock brake system 10.

As described above, during a normal situation, the braking control unit 62b controls operation of each component of the hydraulic control unit 50 so that a braking force commensurate with a braking operation performed by the rider is generated in the wheels.

Here, the braking control unit 62b implements an anti-lock brake operation to suppress locking of a wheel by reducing the braking force on that wheel so as to prevent its slip ratio from exceeding a threshold.

The slip ratio is an index indicating the extent to which a wheel is sliding with respect to the road surface, and a slip rate obtained by dividing a difference between the vehicle speed and the wheel speed by the vehicle speed is used as the slip ratio, for example. The braking control unit 62b identifies the vehicle speed of the vehicle 100 (i.e., the speed of the vehicle body) on the basis of the wheel speeds of the front wheel 3 and the rear wheel 4, and calculates the slip rate of each wheel, for example. It should be noted that a parameter other than the slip rate (e.g., another physical amount which can be substantially converted to the slip rate) may equally be used as the slip ratio.

A target slip ratio is a numerical range having an upper limit value (also referred to herein as a threshold) and a lower limit value (as referred to herein as a floor). The following description relates to an example in which the target slip ratio is a numerical range, but the target slip ratio may equally be a simple numerical value rather than a numerical range.

When locking of a wheel occurs, or there is a possibility of locking, the braking control unit 62b starts the anti-lock brake operation. In the anti-lock brake operation, the braking force on the wheel is adjusted to a braking force that makes it possible to avoid locking. Moreover, before the start of the anti-lock brake operation, the braking control unit 62b may vary an increase gradient of the braking force on the wheel so as to make it smaller than an increase gradient that depends solely on the amount of operation of the brakes by the rider. The braking control unit 62b may control the increase gradient of the braking force on the wheel to a desired gradient by opening/closing the inlet valve 31 while controlling same by means of duty control, pulse control, or a combination thereof, etc., for example.

Specifically, when the slip ratio of a wheel has risen and exceeded the upper limit value of the target slip ratio (i.e., the threshold) of that wheel, the braking control unit 62b starts the anti-lock brake operation. When the anti-lock brake operation is started, the braking control unit 62b first of all reduces the slip ratio of the wheel by reducing the braking force on that wheel. Specifically, the braking control unit 62b sets the inlet valve 31 in a closed state and sets the outlet valve 32 in an open state, and, in that state, drives the pump 34 so as to reduce the hydraulic pressure of the brake fluid in the wheel cylinder 24 and reduce the braking force generated in the wheel.

The braking control unit 62b then closes both the inlet valve 31 and the outlet valve 32 to thereby maintain the hydraulic pressure of the brake fluid in the wheel cylinder and maintain the braking force generated in the wheel. After this, when the slip ratio of the wheel has dropped and fallen below the lower limit value of the target slip ratio (i.e., the floor) of that wheel, the braking control unit 62b increases the slip ratio of the wheel by increasing the braking force on that wheel. Specifically, the braking control unit 62b opens the inlet valve 31 and closes the outlet valve 32 so as to increase the hydraulic pressure of the brake fluid in the wheel cylinder 24 and increase the braking force generated in the wheel.

After this, when the slip ratio of the wheel has risen and once again exceeded the upper limit value of the target slip ratio of that wheel, the control to reduce the slip ratio of the wheel by reducing the braking force on that wheel is once again performed. The following control is thus repeatedly performed: control to reduce the slip ratio of the wheel by reducing the braking force on that wheel, control to maintain the braking force on the wheel, and control to increase the slip ratio on the wheel by increasing the braking force on that wheel. It should be noted that the braking control unit 62b may maintain the slip ratio of the wheel in the anti-lock brake operation when the slip ratio of the wheel is between the upper limit value and the lower limit value of the target slip ratio (i.e., between the threshold and the floor).

Moreover, the braking control unit 62b may separately control the braking force generated in the front wheel 3 and the braking force generated in the rear wheel 4, by separately controlling respective operations of the front-wheel braking mechanism 12 and the rear-wheel braking mechanism 14.

As described above, the control unit 62 in the control device 60 is capable of implementing the anti-lock brake operation to suppress locking of a wheel of the vehicle 100 by reducing (and, alternately, increasing) the braking force or the driving force on that wheel so as to control the slip ratio of that wheel to the target slip ratio. Here, the control unit 62 implements the anti-lock brake operation on the rear wheel 4 (specifically, the operation in which locking of the rear wheel 4 is suppressed by reducing the braking force on the rear wheel 4 so as to control the slip ratio of the rear wheel 4 to the target slip ratio) on the basis of whether or not there is a slide request, which is a determination that the rider has initiated or is attempting to initiate an intentional slide or drift maneuver. This makes it possible to achieve a balance between driving freedom and safety in the vehicle. The processing relating to the anti-lock brake operation on the rear wheel 4 which is performed by such a control device 60 is described in detail below.

As described above, the control unit 62 implements the anti-lock brake operation on the rear wheel 4 on the basis of whether or not there is a slide request from the rider. Specifically, when there is a slide request from the rider, the control unit 62 implements a slide control mode to implement the anti-lock brake operation on the rear wheel 4. In the slide control mode, the initial values of the slip ratio threshold and floor are higher than when there is no slide request. Additionally, in slide control mode, the threshold (and, correspondingly the floor) may be further increased along a range of values by way of a user interface device.

It should be noted that a mode in which the slide control mode is not implemented will be referred to below as the "normal mode". That is, while the normal mode is in progress, the anti-lock brake operation is implemented on the rear wheel 4 in a state in which the target slip ratio of the rear wheel 4 is lower than while the slide control mode is in progress.

The control unit 62 makes the lower limit value of the target slip ratio of the rear wheel 4 in the anti-lock brake operation on the rear wheel 4 which is implemented while the slide control mode is in progress higher than the upper limit value of the target slip ratio of the rear wheel 4 in the anti-lock brake operation on the rear wheel 4 which is implemented while the normal mode is in progress. While the slide control mode is in progress, a state in which the slip ratio of the rear wheel 4 is higher than while the normal mode is in progress is therefore permitted.

Figure 5:
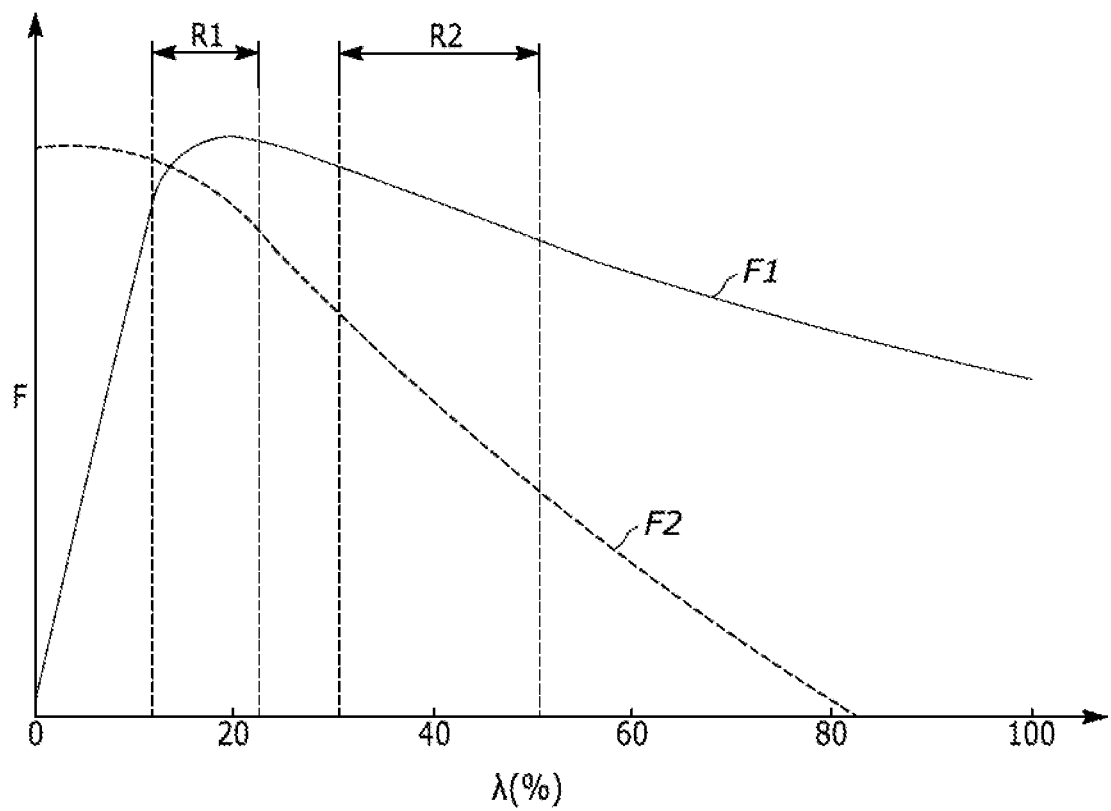
FIG. 5 is a graph showing an example of a relationship of slip rate and gripping force of a wheel of a vehicle according to an embodiment of the present invention.

FIG. 5 is a diagram showing an example of a relationship of slip rate $\lambda$ and gripping force F of a wheel of the vehicle 100. In FIG. 5, the slip rate $\lambda$ is shown on the horizontal axis, and the gripping force F is shown on the vertical axis. The gripping force F of the tire (i.e., the friction force generated between the tire and the road surface) is broken down into a longitudinal gripping force F1 and a lateral gripping force F2. The longitudinal gripping force F1 is a component of the tire gripping force F parallel to the direction of advance of the tire. The lateral grip-ping force F2 is a component of the tire gripping force F perpendicular to the direction of advance of the tire. As shown in FIG. 5, the longitudinal gripping force F1 generally increases in the course of the slip rate $\lambda$ increasing from 0% to around 20%, after which it decreases as the slip rate $\lambda$ increases. Furthermore, the lateral gripping force F2 generally decreases as the slip rate $\lambda$ becomes higher. In sliding travel, the rear wheel 4 must be allowed to sideslip, and therefore the lateral grip-ping force F2 of the tire of the rear wheel 4 needs to be reduced to a certain extent.

A range R1 of the slip rate $\lambda$ in FIG. 5 corresponds to an example of the target slip ratio of the rear wheel 4 in the anti-lock brake operation on the rear wheel 4 which is implemented while the normal mode is in progress. Meanwhile, a range R2 of the slip rate $\lambda$ in FIG. 5 corresponds to an example of the initial target slip ratio of the rear wheel 4 in the anti-lock brake operation on the rear wheel 4 which is implemented while the slide control mode is in progress. The lower limit value of the range R2 corresponding to the slide control mode is higher than the upper limit value of the range R1 corresponding to the normal mode. While the slide control mode is in progress, a state in which the slip ratio of the rear wheel 4 is higher than while the normal mode is in progress is therefore permitted.

As described above, according to this embodiment, the slide control mode is implemented when there is a slide request from the rider, and a state in which the slip ratio of the rear wheel 4 is high is permitted. Accordingly, during sliding travel, it is possible to suppress an excessive increase in the lateral gripping force F2 of the tire of the rear wheel 4 caused by the anti-lock brake operation, therefore enabling sliding travel in accordance with the rider's intention. A balance between driving freedom and safety in the vehicle 100 can therefore be achieved.

Figure 6:
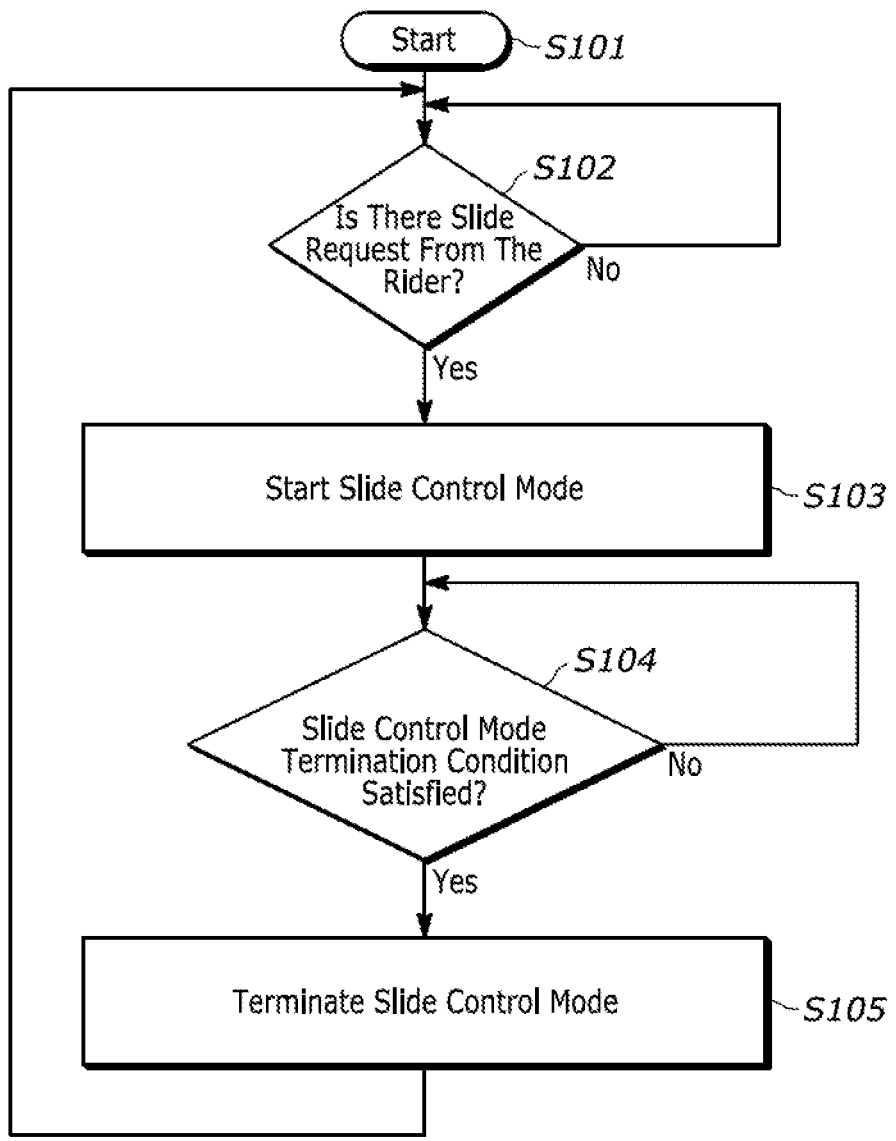
FIG. 6 is a flowchart showing an example of a processing flow relating to switching between a normal mode and a slide control mode, performed by the control device according to an embodiment of the present invention.

FIG. 6 is a flowchart showing an example of a processing flow relating to switching between the normal mode and the slide control mode, performed by the control device. The control flow shown in FIG. 6 is started in a situation in which the normal mode is being implemented. Specifically, the control flow shown in FIG. 6 is performed by means of the control unit 62 of the control device 60. It should be noted that other types of processing may also be performed during the course of the control flow shown in FIG. 6.

Step S101 in FIG. 6 corresponds to the start of the control flow shown in FIG. 6.

When the control flow shown in FIG. 6 is started, in step S102, the determination unit 62a determines whether or not there is a slide request from the rider. If there is deemed to be a slide request from the rider (step S102/YES), the processing advances to step S103, in which the braking control unit 62b starts the slide control mode to increase the initial target slip ratio of the rear wheel 4. It should be noted that the details of the processing while the slide control mode is in progress will be described later with reference to FIG. 7. If, on the other hand, there is deemed to be no slide request from the rider (step S102/NO), the processing of step S102 is repeated.

In the determination processing in step S102, the determination unit 62a may determine whether or not there is a slide request on the basis of driving operation information of the rider. The driving operation information is information relating to a driving operation performed by the rider, and includes various parameters that may change correspondingly with driving operations. For example, the driving operation information may include: deceleration of the vehicle 100, lean angle of the vehicle 100, lateral acceleration of the vehicle 100, yaw rate of the vehicle 100, or vehicle speed of the vehicle 100, or else rates of change thereof, etc.

For example, the determination unit 62a may determine that there is a slide request from the rider when the deceleration of the vehicle 100 is greater than a reference deceleration and the lean angle of the vehicle 100 is also greater than a reference lean angle.

It should be noted that the determination as to whether or not there is a slide request based on the driving operation information is not particularly limited to the example given above. For example, as described above, multiple items of driving operation information may be used, or only one item of driving operation information may be used. Furthermore, the combination of driving operation information items used for determining whether or not there is a slide request may differ from the example given above. Furthermore, the determination as to whether or not there is a slide request based on the driving operation information may employ the lean angle, as described above, or it may employ the lateral acceleration or yaw rate instead of the lean angle in that case. The control device 60 may acquire the lateral acceleration and the yaw rate by utilizing a sensor capable of detecting the lateral acceleration and a sensor capable of detecting the yaw rate.

If the determination is YES in step S102, then, following step S103, the determination unit 62a determines whether or not a slide control mode termination condition has been satisfied in step S104. If it is determined that the slide control mode termination condition has been satisfied (step S104/YES), then the processing advances to step S105, in which the braking control unit 62b terminates the slide control mode and restores the target slip ratio of the rear wheel 4 to its original value. The processing then returns to step S102. If it is determined that the slide control mode termination condition has not been satisfied (step S104/NO), then the processing of step S104 is repeated.

A condition of there having been no slide request from the rider may be used as the condition for terminating the determination processing of step S104, for example. When the deceleration of the vehicle 100 has fallen below the reference deceleration, or when the vehicle speed of the vehicle 100 has fallen below the reference speed, etc., the determination unit 62a may determine that there has been no slide request, and may determine that the slide control mode termination condition has been satisfied, for example.

The details of the processing while the slide control mode is in progress will be described below with reference to FIG. 7.

Figure 7:
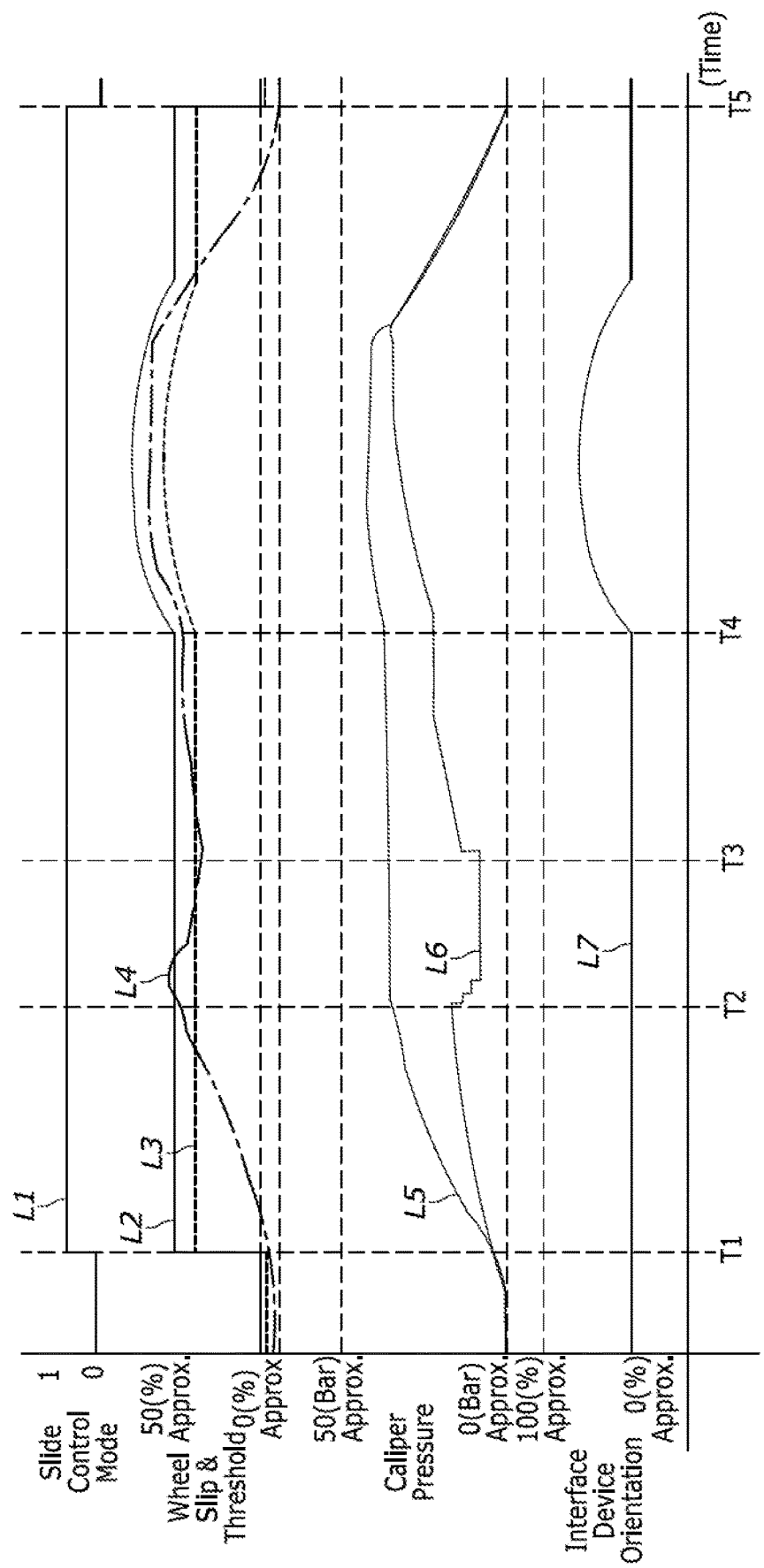
FIG. 7 is a graph showing transitions of various state quantities over time during travel of a vehicle according to an embodiment of the present invention.

FIG. 7 is a graph showing transitions of various state quantities during travel of the vehicle 100 over a period of time. FIG. 7 shows a time axis on the horizontal axis, and values of the various state quantities on the vertical axis. FIG. 7 shows the following as the various state quantities: a slide control mode flag L1, an upper limit value L2 of the target slip ratio (i.e., the threshold), a lower limit value L3 of the target slip ratio (i.e., the floor), a slip ratio L4 of the rear wheel 4, a rear brake master pressure (i.e., the user-applied brake pressure) L5, and a rear brake caliper pressure L6. The slide control mode flag L1 is a flag indicating which of the normal mode and the slide control mode is being implemented, where the normal mode is implemented when the slide control mode flag L1 is 0 and the slide control mode is implemented when the slide control mode flag L1 is 1.

In the example shown in FIG. 7, the vehicle 100 is traveling straight ahead before a time point T1. Furthermore, the slide control mode flag L1 is 0, and the normal mode is being implemented (that is, the slide control mode is not being implemented). At the time point T1, there is deemed to be a slide request from the rider, the slide control mode flag L1 is switched to 1, and the slide control mode is started. From the time point T1 and onward, the initial target slip ratio of the rear wheel 4 (which is the range between the upper limit value L2 and the lower limit value L3) is therefore higher than before the time point TL. Specifically, from the time point T1 and onward, the lower limit value L3 of the target slip ratio of the rear wheel 4 is higher than the upper limit value L2 of the target slip ratio of the rear wheel 4 as it was before the time point T1.

From the time point T1 and onward (i.e., when the slide control mode is being implemented), a difference between the upper limit value L2 and the lower limit value L3 of the target slip ratio of the rear wheel 4 is greater than it was before the time point T1 (i.e., when the slide control mode was not being implemented). As explained above, while the anti-lock brake operation on the rear wheel 4 is in progress, the braking force L6 on the rear wheel 4 is repeatedly increased and reduced. The frequency of repeating the increases and reductions in the braking force L6 on the rear wheel 4 in the anti-lock brake operation becomes smaller as the difference becomes greater between the upper limit value L2 and the lower limit value L3 of the target slip ratio of the rear wheel 4. The control unit 62 can therefore set an appropriate frequency of repeating the increases and reductions in the braking force L6 on the rear wheel 4 in the anti-lock brake operation on the rear wheel 4 that is implemented while the slide control mode is in progress, by changing the difference between the upper limit value L2 and the lower limit value L3 of the target slip ratio of the rear wheel 4 between when the slide control mode is being implemented and when it is not being implemented.

It should be noted that a size relationship of the difference between the upper limit value L2 and the lower limit value L3 of the target slip ratio of the rear wheel 4 between when the slide control mode is being implemented and when it is not being implemented is not limited to the example shown in FIG. 7. For example, when the slide control mode is being implemented, the control unit 62 may make the difference between the upper limit value L2 and the lower limit value L3 of the target slip ratio of the rear wheel 4 smaller than when the slide control mode is not being implemented, or the same as when the slide control mode is not being implemented.

In the example shown in FIG. 7, the rider begins to apply the rear brake at T1, thus increasing the rear master pressure L5 and rear caliper pressure L6. As the caliper pressure L6 (i.e. the braking force) rises, the rear wheel slip ratio L4 rises as a result. The slip ratio L4 continues to rise until shortly after it reaches the threshold L2.

At time T2, the slip ratio L4 reaches the threshold L2. Thus, even though the rider continues to apply the rear brake (and thus the master pressure L5 keeps rising), the anti-lock brake system begins reducing the caliper pressure L6. Shortly thereafter, the slip ratio IA begins to decrease. The slip ratio L4 continues to decrease until shortly after it reaches the floor L3.

At time T3, the slip ratio L4 reaches the floor L3. Thus, since the rider is still applying the brake (see L5), the anti-lock brake system begins to again raise the rear caliper pressure L6.

At time T4, the rider begins to manipulate the orientation (i.e., position) of a user interface device on the vehicle (see L7) to manually raise the slip ratio threshold L2 above its initial value. The orientation of the user interface device is movable along a range of motion, and the farther the rider moves the user interface device from its resting orientation, the higher the slip ratio threshold will be raised. Thus, the slip ratio threshold is adjustable within a range of values, and the amount of the adjustment depends on the orientation to which the rider manipulates the user interface device. Preferably, the user interface device is a throttle 5 of the vehicle (see FIGS. 1 and 3), but could alternatively be a handlebar 2 of the vehicle, or a dedicated input device. A dedicated input device could be a separate lever, slider, or a pedal in the vicinity of the rider's hands or feet while operating the vehicle to allow for safe and intuitive use. Whatever user interface device is used, the rider may manipulate its orientation to vary the slip ratio threshold along a range values corresponding to such orientation.

While the slip ratio threshold is manually elevated by the rider, the slip ratio L4 may exceed the slide control mode initial threshold value. Because the rider has increased the threshold L2 via the interface device, the anti-lock brake system does not intervene to lower the caliper pressure L6. This enables to rider to execute the slide maneuver he or she intended, without interruption by the anti-lock brake system. As the rider releases the user interface device, the threshold L2 returns to its slide control mode initial value. As the rider releases the brake, the master pressure L5 and caliper pressure L6, and correspondingly the slip ratio L4, begin to fall.

At time T5, the slide maneuver is deemed complete and the anti-lock brake system switches out of slide control mode and back into normal mode, thus dropping the threshold L2 to its normal mode initial value. For more detail on the operation of an anti-lock brake system as it relates to controlling vehicle slide, see WO 2021/260475 A1, which is by the same inventor and incorporated by reference herein.

It should be noted that the description given above relates to an example in which the anti-lock brake operation to suppress locking of the rear wheel 4 is implemented by increasing/reducing the braking force on the rear wheel 4, but the control unit 62 may also implement the anti-lock brake operation to suppress locking of the rear wheel 4 by increasing/reducing the driving force on the rear wheel 4.

In the anti-lock brake operation to suppress locking of the rear wheel 4 by increasing/reducing the driving force on the rear wheel 4, the control unit 62 may control the driving force on the rear wheel 4, which is the drive wheel, by controlling operation of the engine 70, for example. For example, the control unit 62 may cause the engine 70 to output a driving force in a direction for decelerating the vehicle 100 by stopping ignition in the engine 70 or stopping the supply of fuel into the cylinders (that is, engine braking may be produced). The control unit 62 can thus cause the engine 70 to output driving forces in both a direction for decelerating the vehicle 100 and a direction for accelerating the vehicle 100 by adjusting the ignition timing and the amount of fuel supply in the engine 70. The control unit 62 can therefore control the slip ratio of the rear wheel 4 to the target slip ratio by increasing/reducing the driving force on the rear wheel 4.

In the anti-lock brake operation to suppress locking of the rear wheel 4 by increasing/reducing the driving force on the rear wheel 4, the control unit 62 repeatedly performs the following control: control to reduce the slip ratio of the rear wheel 4 by increasing the driving force on the rear wheel 4, and control to increase the slip ratio of the rear wheel 4 by reducing the driving force on the rear wheel 4 (e.g., by generating engine braking). The slip ratio of the rear wheel L4 is con-trolled to the target slip ratio by this means. When the anti-lock brake operation is implemented while increasing/reducing the driving force on the rear wheel 4 on the basis of whether or not there is a slide request, the control unit 62 may implement processing to substitute the braking force on the rear wheel 4 with the driving force on the rear wheel 4 in each of the processes of the anti-lock brake operation described above, in which the braking force on the rear wheel 4 is in-creased/reduced.

It should be noted that processing other than that described above may be performed by the control unit 62. For example, the control unit 62 may change at least one of a control amount relating to the braking force or the driving force on the rear wheel 4, and the target slip ratio of the rear wheel 4, in accordance with state information of the vehicle 100. The state information is information relating to the state of the vehicle 100, examples of which include: information relating to the vehicle speed of the vehicle 100, deceleration of the vehicle 100, number of revolutions of the engine 70, and a state of engagement of the clutch of the vehicle 100; information relating to a gear stage of the vehicle 100; and information relating to the brake operation amount of the vehicle 100, the slip ratio of the wheels, the lean angle of the vehicle 100, the slide angle of the vehicle 100, and a coefficient of friction of the road surface, etc. Furthermore, examples of the control amount relating to the braking force or the driving force on the rear wheel 4 may include an amount of change or a gradient of change of the braking force or the driving force of the rear wheel 4, etc.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. An apparatus for controlling wheel slip in a motorcycle operated by a rider and having two or three wheels, comprising:

an anti-lock brake system, wherein the anti-lock brake system controls a braking force on a wheel of the motorcycle in relation to a slip ratio of the wheel. such that the anti-lock brake system reduces the braking force if the slip ratio exceeds a threshold:

an inertial measurement unit operably connected to the anti-lock brake system, wherein the inertial measurement unit outputs an inertial measurement signal to the anti-lock brake system, and the anti-lock brake system determines based at least in part on the inertial measurement signal whether there is a slide request from the rider; and, a user interface device operably connected to the anti-lock brake system, the user interface device having an orientation. wherein the user interface device is a throttle of the motorcycle, a handlebar of the motorcycle, or a dedicated input device, and the orientation of the user interface device is manipulable by the rider within a range of motion, and, when it is determined by the anti-lock brake system that there is a slide request from the rider, the anti-lock brake system varies the threshold along a range of values based at least in part on the orientation of the user interface device.

2. A method for controlling wheel slip in a motorcycle operated by a rider and having two or three wheels and equipped with an anti-lock brake system, comprising:
    setting a slip ratio threshold of the anti-lock brake system to an initial value;
    generating an inertial measurement signal for the motorcycle with an inertial measurement unit;
    determining based at least in part on the inertial measurement signal whether there is a slide request from the rider;
    increasing the slip ratio threshold from its initial value in response to the rider manipulating an orientation of a user interface device on the motorcycle only if there is a slide request from the rider, wherein the user interface device is a throttle of the motorcycle, a handlebar of the motorcycle, or a dedicated input device;
    applying a braking force to a wheel of the motorcycle in response to the rider actuating a brake of the motorcycle:
    determining a slip ratio of the wheel; and,
    reducing the braking force if the slip ratio exceeds the slip ratio threshold.

3. An anti-lock brake system controller for a motorcycle operated by a rider and having two or three wheels, comprising:
    a control device configured to control a braking force on a wheel of the motorcycle in relation to a slip ratio of the wheel, such that the control device reduces the braking force if the slip ratio exceeds a threshold: and,
    an inertial measurement unit operably connected to the control device, wherein the inertial measurement unit outputs an inertial measurement signal to the control device, and the control device determines based at least in part on the inertial measurement signal whether there is a slide request from the rider,
    wherein the control device is further configured to receive a signal from a user interface device operably connected to the control device and having an orientation, wherein the user interface device is a throttle of the motorcycle, a handlebar of the motorcycle. or a dedicated input device, and the orientation of the user interface device is manipulable by the rider within a range of motion,
    and wherein the control device is configured to, only when it is determined that there is a slide request from the rider, vary the threshold along a range of values based at least in part on the orientation of the user interface device.

* * * * *